US009527603B2

(12) United States Patent
Allen et al.

(10) Patent No.: US 9,527,603 B2
(45) Date of Patent: Dec. 27, 2016

(54) METHOD FOR RECOVERING A UAV

(71) Applicant: Arcturus UAV LLC, Rohnert Park, CA (US)

(72) Inventors: Mark Cameron Allen, Petaluma, CA (US); D'Milo Dean Hallerberg, San Francisco, CA (US); Greg P. Timm, Santa Rosa, CA (US)

(73) Assignee: ARCTURUS UAV LLC, Rohnert Park, CA (US)

( * ) Notice: Subject to any disclaimer, the term of this patent is extended or adjusted under 35 U.S.C. 154(b) by 436 days.

(21) Appl. No.: 14/313,350

(22) Filed: Jun. 24, 2014

(65) Prior Publication Data

US 2015/0001340 A1   Jan. 1, 2015

Related U.S. Application Data

(62) Division of application No. 13/204,456, filed on Aug. 5, 2011, now Pat. No. 8,783,607.

(60) Provisional application No. 61/371,380, filed on Aug. 6, 2010.

(51) Int. Cl.
*B64F 1/02* (2006.01)

(52) U.S. Cl.
CPC .................. *B64F 1/02* (2013.01); *B64F 1/025* (2013.01); *B64C 2201/182* (2013.01)

(58) Field of Classification Search
CPC ........ B64F 1/02; B64F 1/025; B64C 2201/18; B64C 2201/182
See application file for complete search history.

(56) References Cited

U.S. PATENT DOCUMENTS

| | | | |
|---|---|---|---|
| 4,653,706 A | 3/1987 | Ragiab | |
| 4,824,282 A * | 4/1989 | Waldecker | E01F 13/046 404/6 |
| 5,560,568 A | 10/1996 | Schmittle | |
| 6,264,140 B1 | 7/2001 | McGeer et al. | |
| 6,902,149 B2 | 6/2005 | Piron | |
| 7,059,564 B2 | 6/2006 | Dennis | |
| 7,066,430 B2 | 6/2006 | Dennis et al. | |
| 7,121,507 B2 | 10/2006 | Dennis et al. | |
| 7,175,135 B2 | 2/2007 | Dennis et al. | |
| 7,195,445 B2 | 3/2007 | Wobben | |
| 7,419,326 B2 | 9/2008 | Rastegar et al. | |
| 7,686,247 B1 | 3/2010 | Monson et al. | |
| 2005/0151014 A1 | 7/2005 | McGeer | |
| 2006/0006281 A1 | 1/2006 | Sirkis | |
| 2008/0191091 A1 | 8/2008 | Hoisington et al. | |
| 2009/0189016 A1 * | 7/2009 | Heppe | B64F 1/02 244/110 R |

* cited by examiner

*Primary Examiner* — Nicholas McFall
(74) *Attorney, Agent, or Firm* — Haynes Beffel & Wolfeld LLP; James F. Hann

(57) ABSTRACT

An unmanned aerial vehicle (UAV) recovery system comprises a base and a pneumatic capture net, including a set of upwardly extending, flexible, inflatable tubes, supported by a capture net support assembly. Drag forces are exerted on a UAV by the set of tubes when the UAV flies into them. In some examples the recovery system includes a plurality of decelerators, each decelerator having a supply of a restraint strap, connected to the pneumatic net, which can be pulled from the decelerator upon the application of a sufficient force so that movement of the pneumatic net is resistible by forces exertable by the decelerators on the pneumatic net.

13 Claims, 8 Drawing Sheets

METHOD FOR RECOVERING A UAV

CROSS-REFERENCE TO OTHER APPLICATIONS

This application is a divisional of co-pending U.S. patent application Ser. No. 13/204,456, filed on 5 Aug. 2011, issued as U.S. Pat. No. 8,783,607, entitled UAV Recovery System; which application claims benefit of U.S. Provisional Patent Application No. 61/371,380, filed on 6 Aug. 2010.

BACKGROUND OF THE INVENTION

Unmanned aerial vehicles (UAVs), also known as remotely operated aircraft, are used for many different military and commercial applications. These applications include reconnaissance, surveillance and security; communication relay; area mapping; monitoring erosion and environmental changes; agricultural, farming and commercial fishing purposes; fire detection and damage assessment; surveillance of borders, harbors and canals; convoy, road and population protection; and natural resources and wildlife management.

Some UAVs are launched using pneumatic tube launchers to eliminate the need for long runways. UAVs may fly autonomously along a preprogrammed flight path that is modifiable from a ground control station while in flight. It is common to use Differential GPS to provide enhanced accuracy for ensuring that the UAV flies to within inches of the desired location for recovery.

One of the problems with UAVs is how to successfully, that is with no or minimal damage to the aircraft, recover or capture them at the end of a flight if a runway or a runway-like surface, such as a road, is not available. This is a significant problem when the UAV is to land on a boat or ship, such as a helicopter landing pad on a ship. It is also problem in remote or otherwise unimproved areas in the field. Several different recovery systems have been developed to recover the UAV without destroying it. One is to use a horizontal line and a hook on the UAV similar to that used on aircraft carriers with piloted aircraft. Another system uses nets to capture the UAV. Another system, described in U.S. Pat. No. 7,059,564, uses a vertically extending recovery line; a wing of the UAV hits the recovery line which catches the tip of the wing and spins the UAV around until it comes to rest.

BRIEF SUMMARY OF THE INVENTION

An example of an unmanned aerial vehicle (UAV) recovery system comprises a base, a capture net support assembly and a pneumatic capture net. The base is supportable by a support surface. The pneumatic capture net is supported by the capture net support assembly. The pneumatic capture net comprises a set of tubes. The tubes are flexible inflatable tubes placeable in deflated and inflated states. The tubes extend upwardly away from the base when in the inflated state. The set of tubes has a width and a height, the width and height defining an impact area into which a UAV can be directed. Drag forces are exerted on a UAV by the set of tubes when the UAV flies into the impact area of the set of tubes. In some examples the recovery system further comprises a plurality of decelerators, each decelerator comprising a supply of a restraint strap that can be pulled from the decelerator upon the application of a sufficient force. Each restraint strap is connected to the pneumatic net so that movement of the pneumatic net is resistible by forces exertable by the decelerators on the pneumatic net. In some examples the recovery system further comprises a trigger assembly, the trigger assembly comprising a trigger net and a trigger line coupled to the trigger net, the trigger net being positioned at the impact area. In some examples a decelerators is placeable in a locked condition, at which the restraint strap for that decelerator is prevented from being pulled from the decelerator, and an unlocked, use condition. Such decelerator comprises a releasable lock element operably connected to the trigger line so that engagement of the UAV with the trigger net places the decelerator in the unlocked, use condition.

A method for recovering an unmanned aerial vehicle (UAV) after a flight is carried out as follows. A UAV recovery system is set up at a recovery site, the UAV recovery system comprising a base, a capture net support assembly, and a pneumatic capture net. The pneumatic net comprises a set of inflatable, flexible, compliant tubes. The setting up step comprises placing the base on a support surface at the recovery site and erecting the pneumatic capture net adjacent to the base. The pneumatic capture net erecting step comprises supporting the pneumatic net adjacent to the base using the capture net support assembly and inflating the set of tubes of the pneumatic net to place the tubes in an inflated, use state extending upwardly away from the base. A UAV is directed into the pneumatic net along a final flight path, the UAV having wings with forward edges. A drag force is created on the UAV by engagement of at least the forward edges of the wings with at least some of the tubes as the UAV moves along a terminal segment of the final flight path. In some examples the drag force creating step comprises resisting movement of the pneumatic net using decelerators operably connected to the pneumatic net. Some examples further comprise temporarily preventing a decelerator from releasing line from the decelerator, sensing when a UAV engages the pneumatic net, and then permitting such decelerator to release line from the decelerator.

Other features, aspects and advantages of the present invention can be seen on review the figures, the detailed description, and the claims which follow.

DETAILED DESCRIPTION OF THE INVENTION

Figure 1:
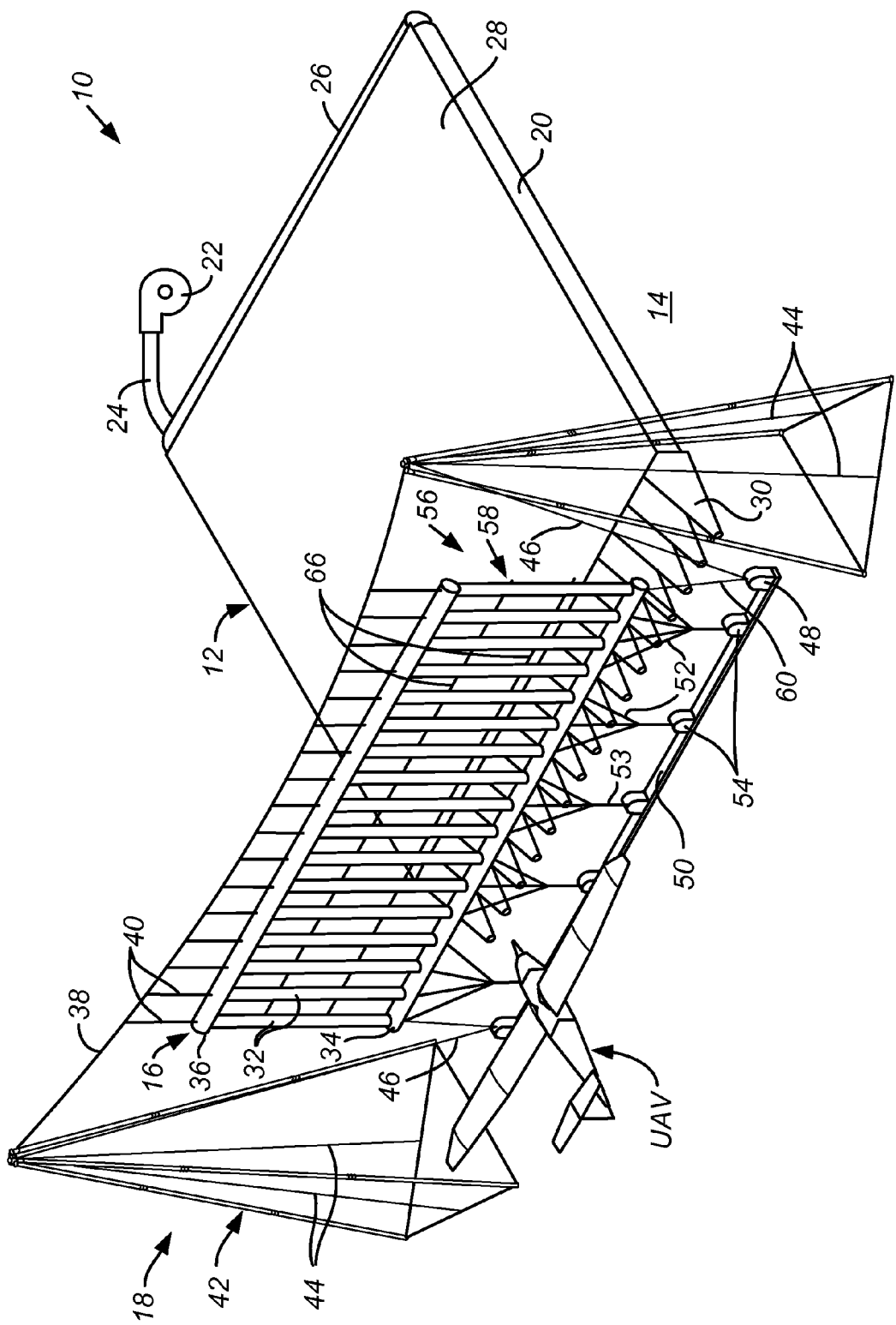
FIG. 1 is an overall view of an example of a UAV recovery system showing a UAV just before contact, the air supply unit, air supply conduits and base manifold being shown in FIG. 1 but not shown in FIGS. 2-4.
Figure 2:
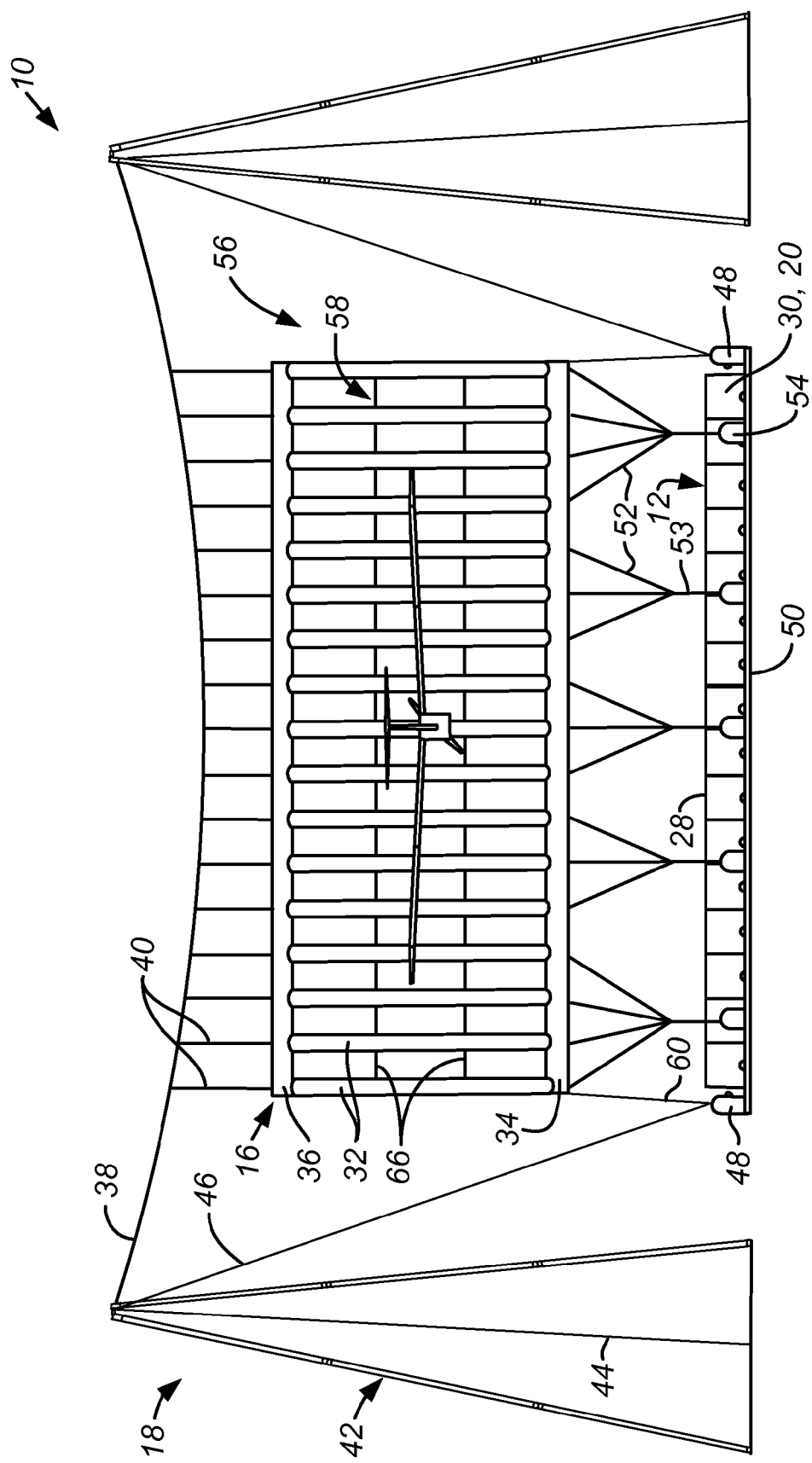
FIG. 2 is a front elevation view of the system of FIG. 1.
Figure 3:
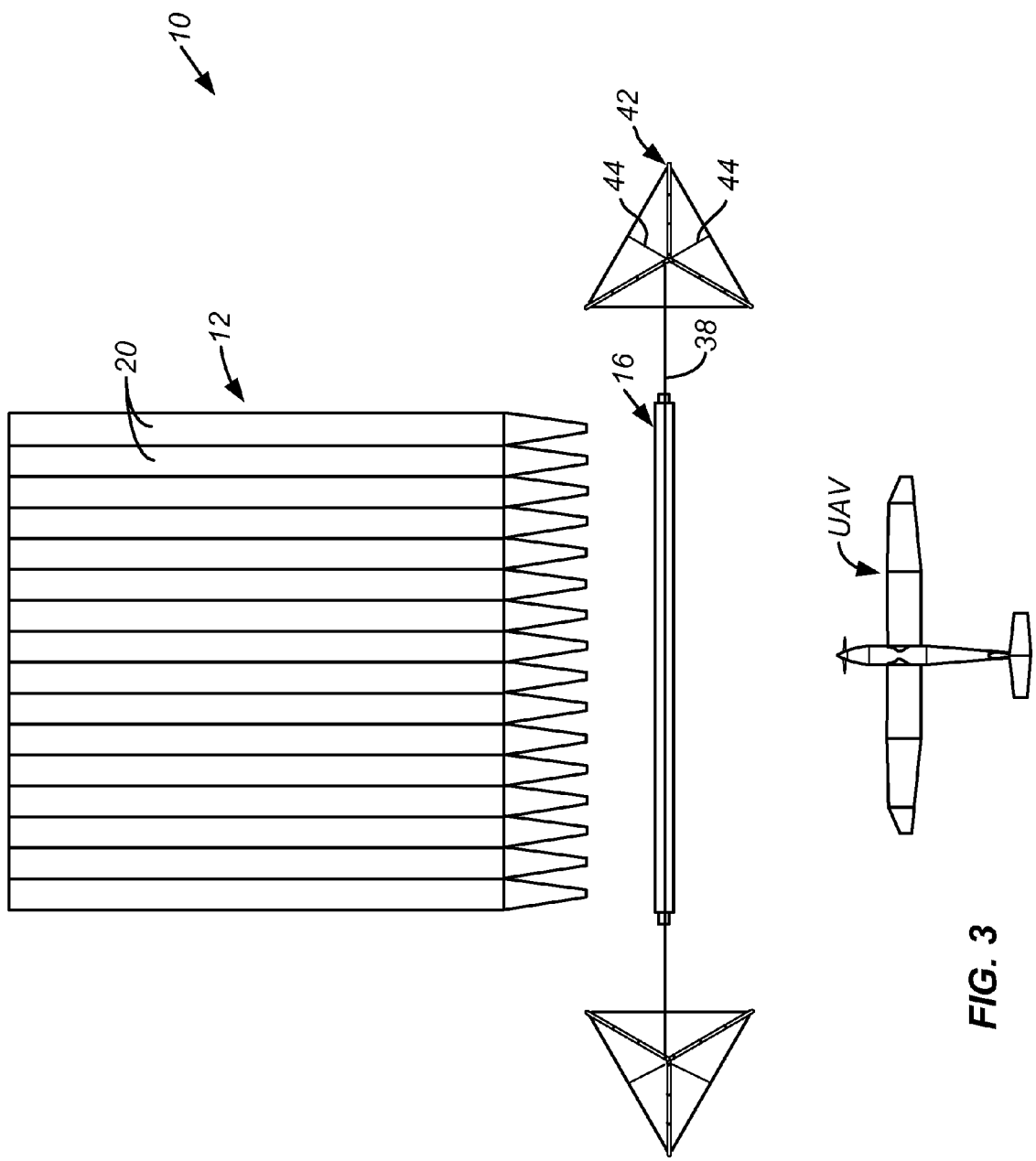
FIG. 3 is a top plan view of the structure of FIG. 1 but with the cover of the base removed to illustrate the plenums.
Figure 4:
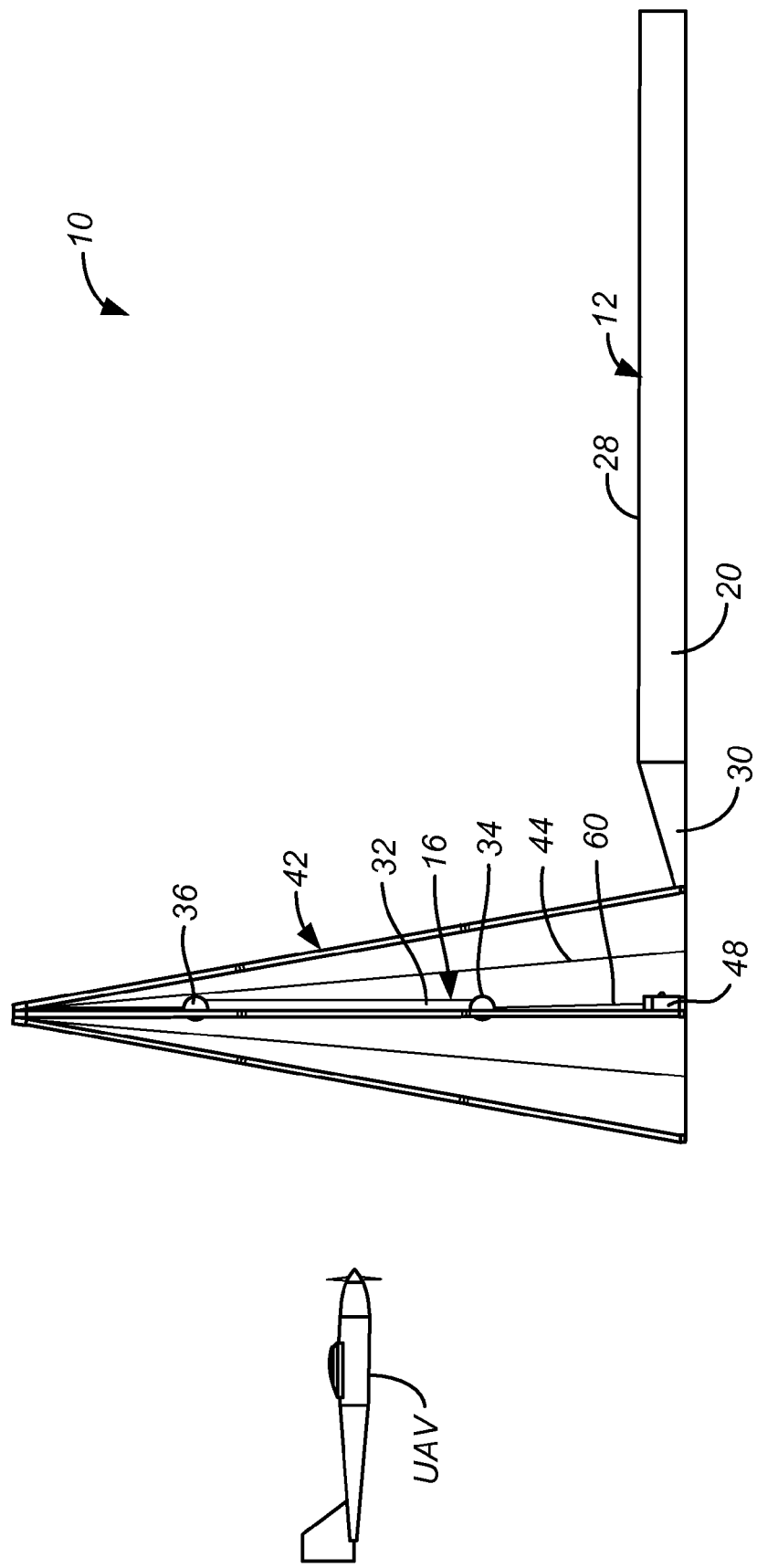
FIG. 4 is a side elevation view of the structure of FIG. 1.

The following description will typically be with reference to specific structural embodiments and methods. It is to be understood that there is no intention to limit the invention to the specifically disclosed embodiments and methods but that the invention may be practiced using other features, elements, methods and embodiments. Preferred embodiments are described to illustrate the present invention, not to limit its scope, which is defined by the claims. Those of ordinary skill in the art will recognize a variety of equivalent variations on the description that follows. Like elements in various embodiments are commonly referred to with like reference numerals.

The present invention relates to the use of a set of inflatable, upwardly extending tubes creating a pneumatic capture assembly such that when a UAV flies into the pneumatic capture assembly, the tubes bend over the wings to decelerate the UAV in a controlled manner causing the aircraft to safely stop. The invention provides enhanced UAV survivability as well as ground crew safety.

An example of a UAV recovery system 10 is described below with reference to FIGS. 1-5C. System 10 includes broadly a base 12, supported a support surface 14, such as the ground or the deck of a ship, a pneumatic capture assembly in the form of a pneumatic capture net 16 supported at one end of the base by a capture net support assembly 18.

The base 12 of the UAV recovery system 10 is made of a layer of individually inflatable base plenums 20. Each base plenum 20 is fluidly coupled to an air supply unit (air compressor) 22 through an air supply conduit 24 and a base manifold 26. The base acts as a pneumatic catch pad. A ground cloth, also called a ground tarp and typically made of nylon, not shown, can be used between the base 12 and the support surface 14 to help protect the base from being punctured by objects, such as glass, sharp rocks, sticks and debris, on the support surface. FIG. 1 illustrates the use of a cover or sheet 28 covering the upper layer of base plenums 20. Although not shown in the figures, base 12 has loop at each corner and two places along each side. These loops are attached to sandbags to secure the base to support surface 14. Other techniques for maintaining base 12 in place, such as the use of ground stakes, may also be used.

The base plenums 20 are preferably fastened to one another using, for example, hook and loop fasteners. Use of separate base plenums permits the removal or replacement of an individual base plenum if the base plenum has become damaged, or for other reasons. In this example the base plenums are 28 feet long and 2 feet in diameter and create a base having a width of about 24 feet, a depth of 28 feet and a height of 2 feet. The forward ends 30 of base plenums 20 are cone shaped and act as an entrance ramp to help upwardly deflect portions of a UAV that are too low.

Pneumatic capture net 16 is positioned, in this example, about 4 feet in front of base 12. Pneumatic capture net 16 preferably includes a row of flexible, compliant, inflatable tubes 32 which extend upwardly from a tube manifold 34. The tubes 32 are supplied with air from an air supply unit, such as air compressor 22, through the tube manifold 34. The connection of air compressor 22 with tube manifold 34 is not shown in the figures for clarity of illustration. The upper ends of the tubes 32 are physically secured to and fluidly connected to a top connector conduit 36. The top connector conduit 36 permits air to flow from the top end of one tube 32 into the top end of one or more other tubes 32 upon UAV impact. Other arrangements of inflatable tubes are also possible. The top connector conduit 36 is connected to an upper strap 38 and a series of vertical straps 40, straps 38 and 40 being components of support assembly 18. The tube manifold 34, top connector conduit 36 and the row of tubes 32 are typically collectively referred to as the pneumatic capture net 16. The tubes, plenums, manifolds and conduits are typically made of sturdy materials such as rip stop nylon.

Support assembly 18 also includes a tripod 42, having, in this example, a height of about 22 feet, at either end of the pneumatic net 16. Each tripod 42 is secured in place by two earth anchors 44. The capture net support assembly 18 comprises, in this example, tripods 42, upper strap 38 and vertical straps 40. Each end of the upper strap 38 is connected to a restraint strap 46 which extends over a pulley, not shown, at the upper tip of each tripod 42. Each restraint strap 46 extends downwardly to a side decelerator 48. The side decelerators are secured to a base board 50. The base board 50 is secured to the support surface 14 in a manner appropriate to the support surface. For example, when the system 10 is being placed in a field and the support surface 14 is the earth, the base board 50 can be is secured in place using conventional ground spikes or ground anchors.

Base restraint lines or straps 52 extend from the tube manifold 34 to a row of front decelerators 54. The front decelerators 54 are also secured to the base board 50. As shown in FIG. 1, a number of base restraint lines 52 may be connected to one another to form a common base restraint line 53 which is connected to and wound onto a front decelerator 54.

Each side and front decelerator 48 and 54 contains a length of the corresponding line or strap 46 and 53 and provides a restraining or drag force preventing the free release of the line or strap from the decelerator. Base restraint lines 52, 53 are used to stabilize the lower portion of the pneumatic net 16 while restraint straps 46 are used to stabilize the upper portion of the pneumatic net 16. In one example the decelerator is similar to a large fishing reel having a spool, on which the line or strap is wound, with an adjustable disc brake type of friction drag restraining free rotation of the spool. Therefore, the restraining force is provided by both the friction drag and, to a lesser extent, by the inertia of the spool and line wound thereon. Decelerators with other types of drag systems including pneumatic and fluid drag systems may also be used.

It has been found that the use of the pneumatic capture net 16 connected to decelerators 48, 54 provide for the effective capture of UAVs. The tubes 32 of the pneumatic net 16 have a tendency to flatten out on impact so that the braking force on the UAV is spread out over an extended wing surface area. In some examples adjustable drag decelerators are used to permit the amount of braking force provided by the decelerators to be adjusted or selected. The selection of the braking force typically will depend upon the operating conditions, including the type, size and weight of the UAV, wind speed and direction, whether the UAV and its contents are fragile, and the expected impact velocity. In some examples different drag forces can be set on the decelerators in a manner similar to that available on fishing reels. Although not presently used, one or more of the tubes 32, the tube manifold 34 and the top connector conduit 36 can include a pressure relief valve to permit any overpressure therein to be exhausted to atmosphere. The one or more pressure relief valves could be adjustable so as to when they open.

One of the problems created by using the relative large diameter pneumatic tubes 32 is that they are affected by wind. It has been found that in windy conditions the wind forces can be sufficient so that the restraint straps 46 connected to the side decelerators 48 are pulled out from the side decelerators 48 permitting the upper portion of the pneumatic net 16 to be deflected from its normally upright state. That is, wind forces can be sufficient to overcome the drag forces exerted by the side decelerators 48 on the restraint straps 46 to effectively blow over the pneumatic net 16. If a gust of wind causes that to occur during a UAV capture, it could result in the UAV not being safely captured but rather damaged or destroyed. In response to this problem, system 10 includes a trigger assembly 56. The trigger assembly 56 includes broadly a trigger net 58 secured to pneumatic net 16, a trigger or unlock line 60 connected to an extending downwardly from each end corner of the pneumatic net to a trigger lock, not shown, associated with the underlying side decelerator 48. Each trigger lock is made as a part of a side decelerator 48 to operate in a manner discussed below. In this example the trigger net 58 includes first and second parallel, spaced apart lines 66 secured to tubes 32; in other examples a single line or a meshwork of lines could be used. The side decelerators 48 are each placeable in an unlocked, use state, in which strap 46 can be pulled from side decelerator 48 by applying sufficient tension force, and a locked state, in which strap 46 is effectively prevented from being pulled from side decelerator 48.

The trigger lock portion of side decelerator 48 is designed so that under normal circumstances the trigger line 60 can remain in tension between the side decelerator 48 and the pneumatic net 16 so to maintain the side decelerator 48 in the locked state. That is, the forces exerted on the trigger lock portion of the side decelerator 48 by trigger line 60 as a result of the wind on the pneumatic net 16 are not sufficient to cause the trigger lock portion of the side decelerator 48 to unlock the decelerator 48, which would permit the restraint strap 46 to be pulled from the decelerator. Therefore, normal wind forces will create insufficient forces to place the side decelerators 48 in the unlocked, use states, which would allow restraint strap 46 to be pulled out from the side decelerator 48. This is particularly true because system 10 is typically oriented so that the UAV heads into the wind during recovery. Such a wind heading will generally not tend to create large tension forces on the trigger line 60 between the pneumatic net 16 and the trigger lock portion of the side decelerator 48. However, when the UAV contacts the pneumatic capture net 16 and the trigger net 58, a sufficient tension force is exerted by the pneumatic net 16 on the trigger line 60 to cause the trigger lock portion of the side decelerator 48 to permit strap 46 to extend the from side decelerator 48, under tension, during the capture of the UAV. Therefore, only when a UAV strikes the pneumatic capture net 16 will the side decelerator 48 permit the strap 46 to be pulled from the side decelerator. Also, upon UAV impact base restraint lines 52 are pulled from the front decelerators 54. The impact force of the UAV is then effectively absorbed by the pneumatic net 16 and the side and front decelerators 48, 54.

In this example it has not been found necessary to include releasable lock elements associated with the front decelerators 54 connected to the tube manifold 34 because the wind forces at the lower end of the pneumatic net 16 are not typically sufficient to cause the tube manifold to be moved about by the wind to any significant extent. However, in appropriate situations one or more of the front decelerators 54 secured to the tube manifold 34 may also have releasable lock elements to help prevent undesirable movement of the pneumatic net 16 prior to impact by a UAV.

In some examples trigger line 60 could be connected directly to trigger net 58 instead of indirectly to trigger net 58 through pneumatic capture net 16. Also, in some examples the inflatable tubes constituting pneumatic capture net 16 may be constructed and connected in such a manner that no separate trigger net would be used but rather the pneumatic capture net would act as the trigger net.

Instead of the mechanical actuation of the lock elements associated with the decelerators, the actuation could be accomplished using electrically actuated release lock elements. Such a release lock element could be operated using signals provided over wires or in a wireless manner. The trigger for sending the signal could be, for example, the initial contact with the trigger net or through the use of a proximity or other type of noncontact sensor. The signal could also be sent by an operator at, or remote from, the site.

The upper strap 38 and the vertical straps 40, in this example, may be made of lengths of one-inch nylon strap sewn at their junctions. The junctions of the vertical straps and the top connector conduit 36 are preferably strong connections, typically sewn or other reinforced connections when straps and the tubes are both fabric-based materials. Trigger lines 60 of trigger net 58 are, in this example, sewn to manifold 34.

To prevent damage to the UAV, it is important that the maximum deceleration be limited to an amount the UAV, and any payload carried by the UAV, can withstand. That is, an aircraft flying into a set of rigid poles would no doubt be quickly stopped but would also be destroyed. The successful capture or recovery of the UAV requires a controlled deceleration of the UAV thereby limiting the decelerating forces exerted by the pneumatic net 16 on the UAV. Upon impact with the pneumatic capture net 16, an initial drag force on the UAV is created by the forward edges of the wings engaging the tubes 32 as the UAV moves along a terminal segment of the final flight path. This causes the tubes 32 to deform and create an initial drag force on the UAV. As the UAV continues its forward movement, while decelerating, the pneumatic net 16 pulls on the trigger lines 60 connected to the side decelerators 48, and the tube manifold 34 of the pneumatic capture net 16 pulls on the straps 46 connected to the front decelerators 54. Doing so permits movement of the pneumatic capture net 16 while dissipating the inertial force of the UAV through the drag provided by engagement of the tubes 32 by the wings of the UAV, and by the side and front decelerators 48 and 54. At the end of the capture, the UAV, together with portion the pneumatic and trigger nets 16 and 58, come to rest on the base 12.

To capture the UAV, the UAV is typically directed to fly into the center of the pneumatic net 16. In some cases, all or part of the UAV may be lower than desired. Recognizing this, the UAV recovery system may include an entrance ramp at the front end of the base 12. The entrance ramp, such as that created by cone shaped ends 30 of plenums 20, preferably has a low friction surface to help redirect a low-flying UAV to a more appropriate height. In some examples the entrance ramp may be placed in front of pneumatic capture net 16 or on both sides of the pneumatic capture net. In the latter case the entrance ramp may need to be configured to accommodate the base restraint lines 52 and front decelerators 54 by, for example, providing appropriately positioned cutouts.

Once the UAV has been brought to rest, the air supply units can be turned off or down to a lower pressure to permit the UAV to be removed from the trigger net, the pneumatic net, and the various straps and lines. After recovering the UAV, the air supply unit or units, such as air compressor 22, can be once again used to inflate the pneumatic net 16, and, if necessary, the base 12, for the recovery of any additional UAVs. When there are no more UAVs to be recovered, the base plenums 20, tubes 32, conduits 24, manifolds 26, 34, and any other inflatable components, are deflated. The air compressor 22 is detached from the manifolds, the various lines are detached from their associated components, the tripods 42 are collapsed and the base board 50 is disconnected from the support surface 14. The extensive use of collapsible components permits some or all of the components to be folded into a relatively compact volume for ease of transport and storage.

Some examples of the UAV recovery system 10 are easily transported to a recovery site when deflated. When not in use, the deflated the UAV recovery system can be stored in a compact package. Assume an example of a UAV recovery system having 12 base plenums 20 each 28 feet long and 2 feet wide; a 22 feet tall by 24 feet wide pneumatic capture net 16 including 17 pneumatic tubes, each tube having a diameter of about 4-6 inches. This equipment, when folded and deflated, along with the associated equipment, can typically fit into relatively small containers to facilitate both transport and storage. Minimizing storage space is especially important in situations where storage space is limited, such as on a ship. The ability to be quickly set up, taken down and placed in a suitably small size configuration for transport and storage are important advantages achieved by the present invention.

One example of a method for recovering a UAV after a flight is carried out as follows. Once at the recovery site, the UAV recovery system 10 can be quickly set up. The base 12, support assembly 18, pneumatic net 16 and trigger assembly 56 are arranged in the appropriate direction relative to the final flight path. One or more air supply units 22 are connected to the conduits and manifolds so that the inflatable components can be inflated. The front and side decelerators 54 and 48 are adjusted to apply the appropriate drag force on the base restraint lines 52 and the restraint straps 46. While an entrance ramp may be incorporated as part of the inflatable plenums 20, in some situations it may be desired to have a non-inflatable, but typically foldable, entrance ramp. Typically the UAV is pre-programmed to fly to the recovery site at the end of the mission. In some situations it may be desirable to have someone at the recovery site with the ability to make minor corrections to the final flight path of the UAV to help the UAV contact the pneumatic net 16 at the center of the impact area, the impact area being defined by the pneumatic net. A local Differential GPS transmitter is typically used at the recovery site to help ensure the UAV impacts the pneumatic net at or close to the desired center position.

Figure 5A:
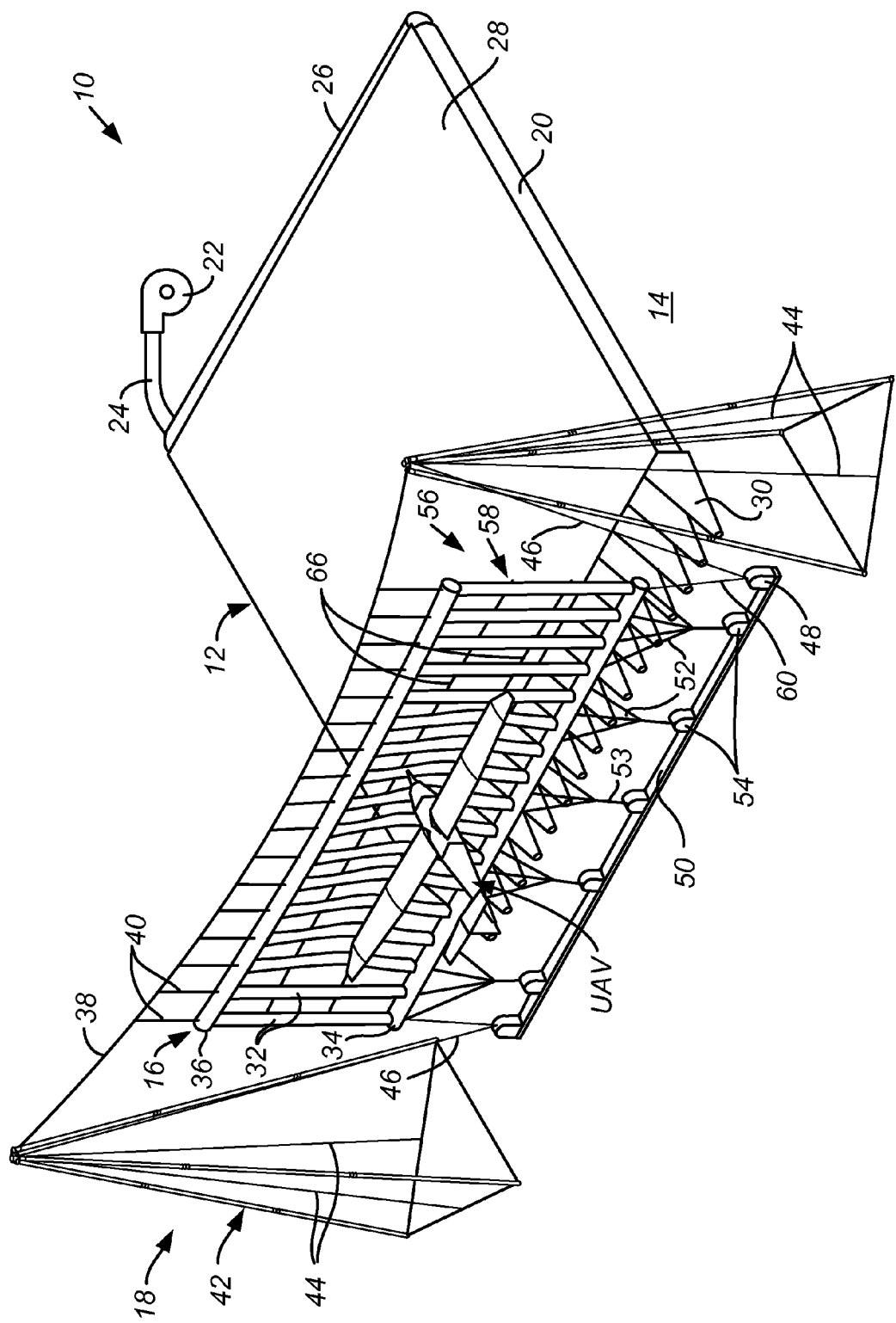
FIGS. 5A-5C are a sequence of drawings showing the initial stages of the capture of a UAV by the structure of FIG. 1.
Figure 5B:
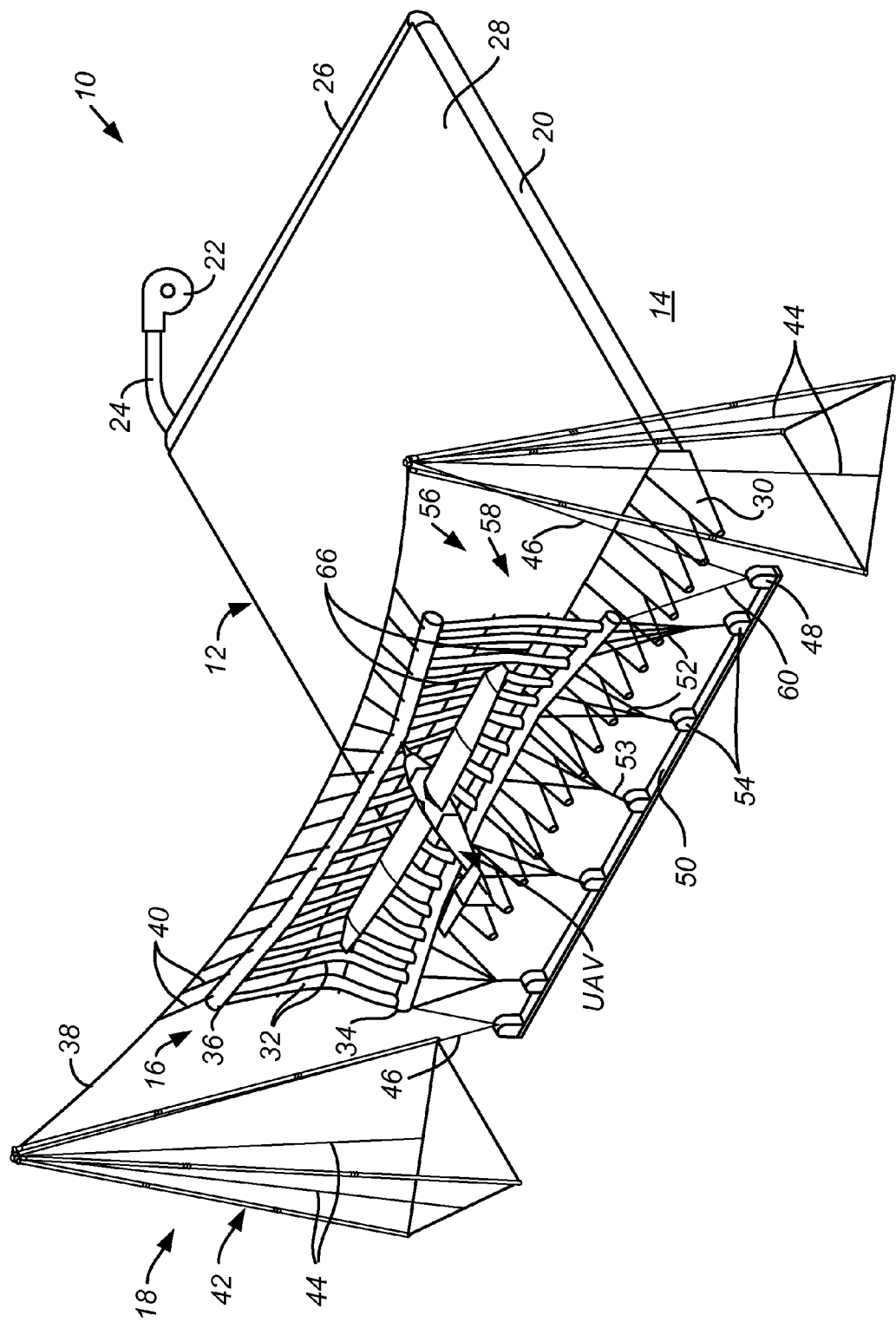
Figure 5C:
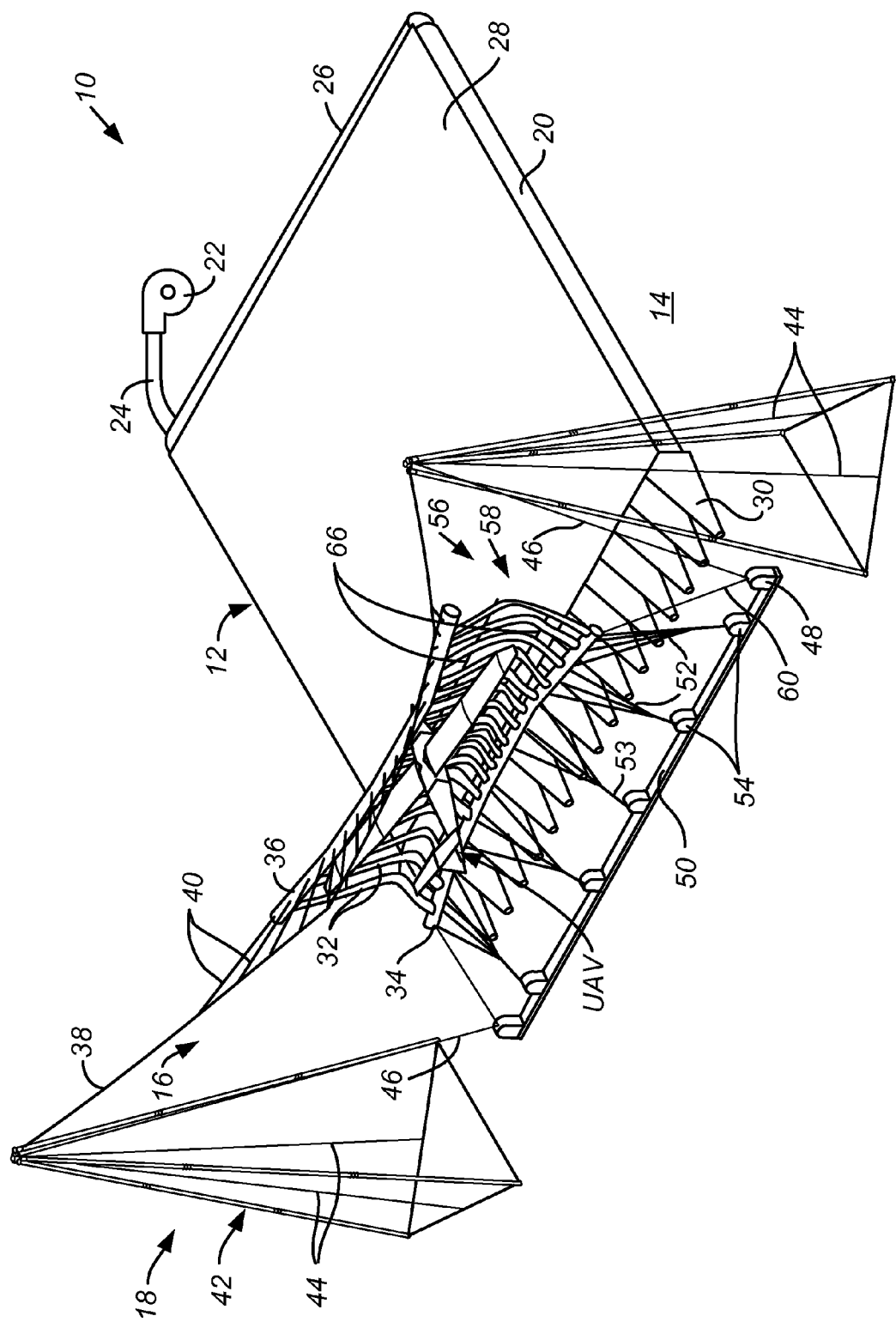

The UAV first contacts the pneumatic capture net 16, and the associated trigger net 58, as shown in FIG. 5A. Upon contact, the trigger lines 60 connecting the trigger net 58 to the side decelerators 48 are released by the trigger locks of the side decelerators to allow the restraint straps 46 to be pulled from the side decelerators 48, subject to an appropriate drag force on straps 46. Upon this contact, an initial drag force on the UAV is created by the forward edges of the wings engaging the tubes 32 of the pneumatic capture net 16 as the UAV moves along a terminal segment of the final flight path. Soon after the initial engagement, the pneumatic capture net 16 begins pulling the base restraint lines 52 and the restraint lines 46 against the drag forces created by the front and side decelerators 54 and 48. See FIGS. 5B and 5C. The UAV then comes to rest, together with the pneumatic net 16 and the trigger net 58, on the pneumatic base 12. Once the UAV has been brought to rest, the air compressor 22 can be turned off or down to a lower pressure to assist the removal of the UAV from the pneumatic net 16 and the trigger net 58. After recovering the UAV, the air compressor 22 can be once again used to inflate the tubes 32 for the recovery of any additional UAVs. When there are no more UAVs to be recovered, the inflatable components are deflated; the air supply units 22 are detached allowing the inflatable components to be folded into a relatively compact volume for ease of transport and storage.

In one testing situation in an open field, the UAV recovery system 10 of FIGS. 1-5C was set up as follows. A ground cloth or tarp was placed on the support surface 14 and then the base plenums 20 were placed upon the ground cloth and secured to one another using hook and loop fasteners. The tripods 42 were secured in place using the earth anchors 44. The air supply units 22 were used to inflate the base plenums 20. Base board 50 was secured to the ground in the field using anchor elements driven into the ground with the decelerators 54 and 48 secured to base board 50. The base restraint lines 52 were connected to the front decelerators 54. Trigger lines 60 extending from the lower outside corners of pneumatic capture net 16 were connected to the lock elements of the side decelerators 48. The restraint straps 46 extending from the upper strap 38 were directed over the pulleys at the tops of the tripods 42 and to the side decelerators 48. The pneumatic net 16 was connected to the air compressor 22 and inflated. The tension on each of the lines 52, 46 extending from the decelerators 54, 48 was adjusted. After recovery of one or more UAVs, the UAV recovery system of FIGS. 1-5C was taken down, including deflating the components, detaching the air supply units from the inflatable components, folding up the inflatable components, and placing all components into containers for transport and storage.

The UAV recovery system example of FIGS. 1-5C should be suitable for a UAV having a wingspan of about 10-18 feet and a weight of about 60 to 200 pounds. The use of decelerators 54, 48 with adjustable drags allows the restraining force of the system to be adjusted primarily according to the weight of the UAV, as well as other considerations associated with the operating environment and considerations associated with the content and construction of the UAV.

Figure 6:
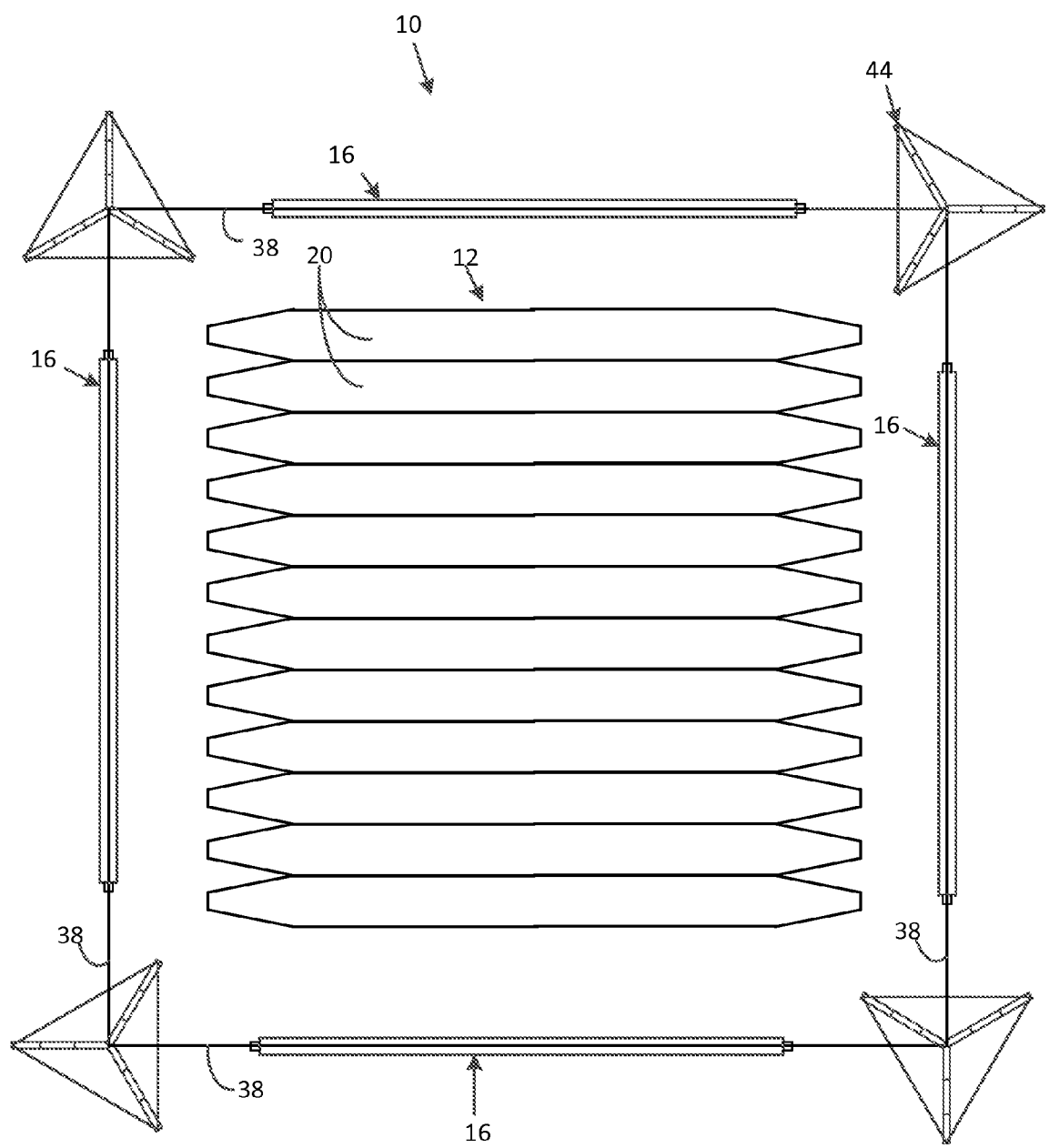
FIG. 6 is a top plan view of a UAV recovery system with a plurality of pneumatic capture nets.

An alternative example of a UAV recovery system 10 can find particular utility when used as a semipermanent installation. In this example a pneumatic capture net 16 is supported along more than one edge of base 12 by support assemblies 18. Therefore, assuming base 12 has 4 sides, 2, 3 or 4 pneumatic capture nets 16 can be used, one along each side, as shown in FIG. 6. Assuming a pneumatic capture net 16 is used along each of the 4 sides, support assemblies 18 would typically use 4 tripods 42 to support the 4 pneumatic capture nets 16. In such a semipermanent installation, base 12 would typically be larger than in the prior example, such as 36'×36'. Base 12 could also be made with 3 sides or with 5 or more sides. In addition, cone shaped ends 30 can be provided at both ends of plenums 20. Similar cone shaped structures can be made to extend from the edges of the outermost plenums 20 so that the entire base 12 has cone shaped deflector structures along its periphery. This example allows for optimal recovery approach regardless of wind direction.

The above descriptions may have used terms such as above, below, top, bottom, over, under, et cetera. These terms may be used in the description and claims to aid understanding of the invention and not used in a limiting sense.

While the present invention is disclosed by reference to the preferred embodiments and examples detailed above, it is to be understood that these examples are intended in an illustrative rather than in a limiting sense. It is contemplated that modifications and combinations will occur to those skilled in the art, which modifications and combinations will be within the spirit of the invention and the scope of the following claims. For example, the base need not be inflatable but rather a separate air duct system could be used to supply compressed air from the air compressor to the pneumatic net.

Any and all patents, patent applications and printed publications referred to above are incorporated by reference.

What is claimed is:

1. A method for recovering an unmanned aerial vehicle (UAV) after a flight comprising:
   setting up a UAV recovery system at a recovery site, the UAV recovery system comprising a capture net support assembly, and a pneumatic capture net, the pneumatic net comprising a set of inflatable, flexible, compliant tubes;
   the setting up step comprising:
      erecting the pneumatic capture net on a support surface at a recovery site, the pneumatic capture net erecting step comprising:
         supporting the pneumatic net adjacent to support surface using the capture net support assembly; and
         inflating the set of tubes of the pneumatic net to place the tubes in an inflated, use state extending upwardly away from the base;
   directing the UAV into the pneumatic net along a final flight path, the UAV having wings with forward edges;
   creating a drag force on the UAV by engagement of at least the forward edges of the wings with at least some of the tubes as the UAV moves along a terminal segment of a final flight path;
   the drag force creating step comprising resisting movement of the pneumatic net using decelerators operably connecting the pneumatic net to the support surface by restraint straps;
   temporarily preventing at least one of the decelerators from releasing restraint strap from the decelerator; and
   sensing when the UAV engages the pneumatic net and then permitting said at least one decelerator to release restraint strap from the decelerator.

2. The method according to claim 1, wherein the drag force creating step comprises resisting movement of the pneumatic net using decelerators operably connected to the pneumatic net.

3. The method according to claim 1, wherein sensing and then permitting step is carried out using a trigger net at the pneumatic net coupled to the at least one decelerator by a trigger line, and further comprising:
   placing the at least one decelerator in an unlocked, use condition when the UAV engages the trigger net causing the trigger line to change the decelerator from a locked condition, during which restraint strap is prevented from being pulled from the decelerator, to the unlocked, use condition, during which restraint strap can be pulled from the decelerator.

4. The method according to claim 1, wherein:
   the setting up step is carried out with the set of tubes having a width and a height defining an impact area when the tubes are in the inflated, use state; and
   the directing step comprises directing the UAV into the impact area.

5. The method according to claim 1, wherein:
   the setting up step is carried out with the UAV recovery system comprising a ground tarp; and
   the setting up step further comprising positioning the ground tarp between the support surface and the base.

6. The method according to claim 1, wherein the setting up step is carried out with the UAV recovery system comprising a generally vertically-extending row of inflatable, compliant, flexible tubes, and the drag force creating step further comprises folding at least some of said engaged tubes over the wings causing the tubes to exert decelerating forces on the UAV.

7. The method according to claim 1, wherein the UAV recovery system comprises a base and the setting up step comprises placing the base on the support surface.

8. A method for recovering an unmannered aerial vehicle (UAV) after a flight comprising:
   setting up a UAV recovery system at a recovery site, the UAV recovery system comprising a capture net support assembly, and a pneumatic capture net, the pneumatic net comprising a set of inflatable, flexible, compliant tubes;
   the setting up step is carried out with the pneumatic capture net comprising a row of tubes, the tubes having first and second ends, the first ends of the tubes being physically and fluidly connected to one another by a lower connector and the second ends of the tubes being physically and fluidly connected to one another by an upper connector;
   the setting up step comprising
      erecting the pneumatic capture net on a support surface at a recovery site, the pneumatic capture net erecting step comprising:
         supporting the pneumatic net adjacent to the support surface using the capture net support assembly;
         inflating the set of tubes of the pneumatic net to place the tubes in an inflated, use state extending upwardly away from the base; and
         positioning the first ends of the tubes adjacent to the support surface;
   directing the UAV into the pneumatic net along a final flight path the UAV having wings with forward edges; and
   creating a drag force on the UAV by engagement of at least the forward edges of the wings with at least some of the tubes as the UAV moves along a terminal segment of a final flight path.

9. The method according to claim 8, wherein the drag force creating step comprises resisting movement of the pneumatic net using decelerators operably connected to the pneumatic net.

10. The method according to claim 9, wherein:
    the setting up step is carried out with the set of tubes having a width and a height defining an impact area when the tubes are in the inflated, use state; and
    the directing step comprises directing the UAV into the impact area.

11. The method according to claim 9, wherein:
    the setting up step is carried out with the UAV recovery system comprising a ground tarp; and
    the setting up step further comprising positioning the ground tarp between the support surface and the base.

12. The method according to claim 9, wherein the setting up step is carried out with the UAV recovery system comprising a generally vertically-extending row of inflatable, compliant, flexible tubes, and the drag force creating step further comprises folding at least some of said engaged tubes over the wings causing the tubes to exert decelerating forces on the UAV.

13. The method according to claim 9, wherein the UAV recovery system comprises a base and the setting up step comprises placing the base on the support surface.

\* \* \* \* \*